United States Patent [19]
Morton

[11] Patent Number: 5,582,132
[45] Date of Patent: Dec. 10, 1996

[54] AUTOMATIC PET WATERING DEVICE

[76] Inventor: Dale J. Morton, 830 Anchor Dr., Henderson, Nev. 89015

[21] Appl. No.: 495,826

[22] Filed: Jun. 28, 1995

[51] Int. Cl.⁶ ....................................... A01K 7/04
[52] U.S. Cl. ....................................... 119/80
[58] Field of Search ................... 119/72, 75, 78, 119/80

[56] References Cited

U.S. PATENT DOCUMENTS

| | | | |
|---|---|---|---|
| 913,158 | 2/1909 | Pelmulder | 119/80 |
| 925,984 | 6/1909 | Bernard | 119/80 |
| 1,282,986 | 10/1918 | Thorson | 119/80 X |
| 1,477,411 | 12/1923 | Aagaard | 119/80 |
| 1,477,447 | 12/1923 | Ritchie | 119/80 |
| 3,368,580 | 2/1968 | Carter | 119/78 |
| 3,759,228 | 9/1973 | Keen | 119/73 X |
| 3,890,934 | 6/1975 | Walcott | 119/78 |
| 3,948,221 | 4/1976 | Wiuniski | 119/78 |
| 4,138,967 | 2/1979 | Tamborrino | 119/80 X |
| 5,212,905 | 5/1993 | Philoetete | 47/48.5 |
| 5,329,877 | 7/1994 | Schumacher | 119/72.5 |
| 5,337,696 | 8/1994 | Edstrom et al. | 119/18 |

*Primary Examiner*—Thomas Price
*Attorney, Agent, or Firm*—Joseph N. Breaux

[57] ABSTRACT

A pet watering device including a watering container having a reservoir cavity, a removable watering container lid having an opening therethrough, a water supply hose having a first and second end, and a valve for regulating the water level in the watering container. The valve mechanism includes a ball cock mechanism and a float which maintains the water level in the reservoir at a predetermined distance from the lid opening. Pets gain access to the water contained within the watering container through the lid opening. The water supply hose is connectable to a common water source such as a garden hose or faucet.

1 Claim, 4 Drawing Sheets

AUTOMATIC PET WATERING DEVICE

TECHNICAL FIELD

The present invention relates to devices for providing pets with an uninterrupted water supply, and more particularly to a device for providing an uninterrupted water source to pets that includes a self regulating valve mechanism.

BACKGROUND ART

This invention provides pets with a constant supply of fresh water. Pets such as dogs require fresh water many times a day to maintain their health and happiness. Pet owners must insure that their pets are provided with an adequate supply of water.

When a pet owner is away from home for an extended period of time he must make arrangements to insure the pet is supplied with adequate water. The pet owner has various options at his disposal with inherent drawbacks. First, he may secure the services of someone else to provide water for the pets at home. This is inconvenient if not impossible in many instances. Alternatively, the pet owner may choose to kennel the animal with a veterinarian. This is expensive as well as inconvenient. Another alternative is to place an inordinate amount of water in a large tub to insure a constant source is available. This is less than desirable as often times pets will splash the water out of the bowl, the water will stagnate over time, or trash pollutes the water.

Another alternative is a device screwed onto an outdoor faucet which when lapped by the pet allows water to pass. However the pet must be allowed into the faucet area and must be able to reach the faucet in order for this device to work. A final alternative is to merely let water drip from a hose end or faucet. This is extremely inefficient and wasteful. It would be a benefit therefore to have a pet watering device that would maintain a constant water supply for pets for an extended period of time without requiring a large basin and requiring little or no maintenance.

GENERAL SUMMARY DISCUSSION OF INVENTION

It is thus an object of the invention to provide an automatic pet watering device that provides an uninterrupted water supply to pets.

It is a further object of the invention to provide an automatic pet watering device that is self regulating and portable.

It is a still further object of the invention to provide an automatic pet watering device that is maintenance free, low cost, and jam resistant.

It is a still further object of the invention to provide an automatic pet watering device that utilizes water in an efficient manner to prevent dehydration of pets.

Accordingly, an automatic pet watering device is provided. The pet watering device comprises: a watering container having a reservoir cavity, a removable lid having an opening therethrough, a water supply hose having a first and second end, and a valve means for regulating the water level in the watering container.

The watering container can take many different shapes and sizes to accommodate all types of pets. In a preferred embodiment the container is trough shaped to maximize the spacing between the valve mechanism and the area from which the pet may drink. The watering container may also take the shape of a bowl. The watering container allows for passage of a water supply to the valve mechanism. Preferably, the watering container includes a watering port on one side through which water may enter the reservoir. A water supply hose is attached to the watering port outside the container, and the valve mechanism located inside the container regulates the water flow into the reservoir.

The watering container lid is removable and rests on the top edge of the container walls in use. The lid has an opening that permits a thirsty pet to gain access to water contained in the watering container reservoir with the lid in place. The opening may take many shapes. Preferably the lid opening is located opposite the valve mechanism when the pet watering device is in use, thus reducing pet contact with the valve. Preferably the lid is of unitary construction with edges extending downward such that a pet may not slide the lid off of the container when in use. The lid may further include a latch mechanism to further insure the lid remains in place.

The water supply hose has a first and second end. The first end is connectable to a conventional garden hose or water faucet. The connection is preferably made of brass. The second end is attached to the watering container and is in fluid communication with the valve mechanism. Preferably the water supply hose is connected to the watering port on the watering container. In use water flows from a conventional faucet or garden hose through the water supply hose to the water supply container watering port.

The valve mechanism is attached to the watering container within the reservoir and regulates the water supplied to the reservoir from the water supply hose such that a relatively constant water level is maintained in the reservoir. The valve mechanism is preferably a ball cock assembly as is commonly known in the art having a float and plunger. Water flowing from the water supply hose causes the water level in the reservoir to rise. As the water level rises to a predetermined level the float activates the ball cock valve mechanism shutting off the flow of water from the water supply hose. As the water level in the reservoir drops as a result of pet consumption or evaporation the valve mechanism opens restoring the water to its predetermined level, and the cycle is repeated.

In a preferred embodiment the lid opening encompasses at least one third of the lid. The lid is positioned on the container such that the lid opening is opposite the float preventing pets from accidentally contacting the float or valve mechanism. Preferably the valve mechanism maintains the water level in the reservoir one to thee inches from the lid of the container while in use.

The water container may further include a valve shield to prevent foreign objects such as grass and bugs introduced by pets or the outdoor environment from clogging the valve mechanism. The valve shield may take many forms.

BRIEF DESCRIPTION OF DRAWINGS

For a further understanding of the nature and objects of the present invention, reference should be had to the following detailed description, taken in conjunction with the accompanying drawings, in which like elements are given the same or analogous reference numbers and wherein.

EXEMPLARY MODE FOR CARRYING OUT THE INVENTION

Figure 1:
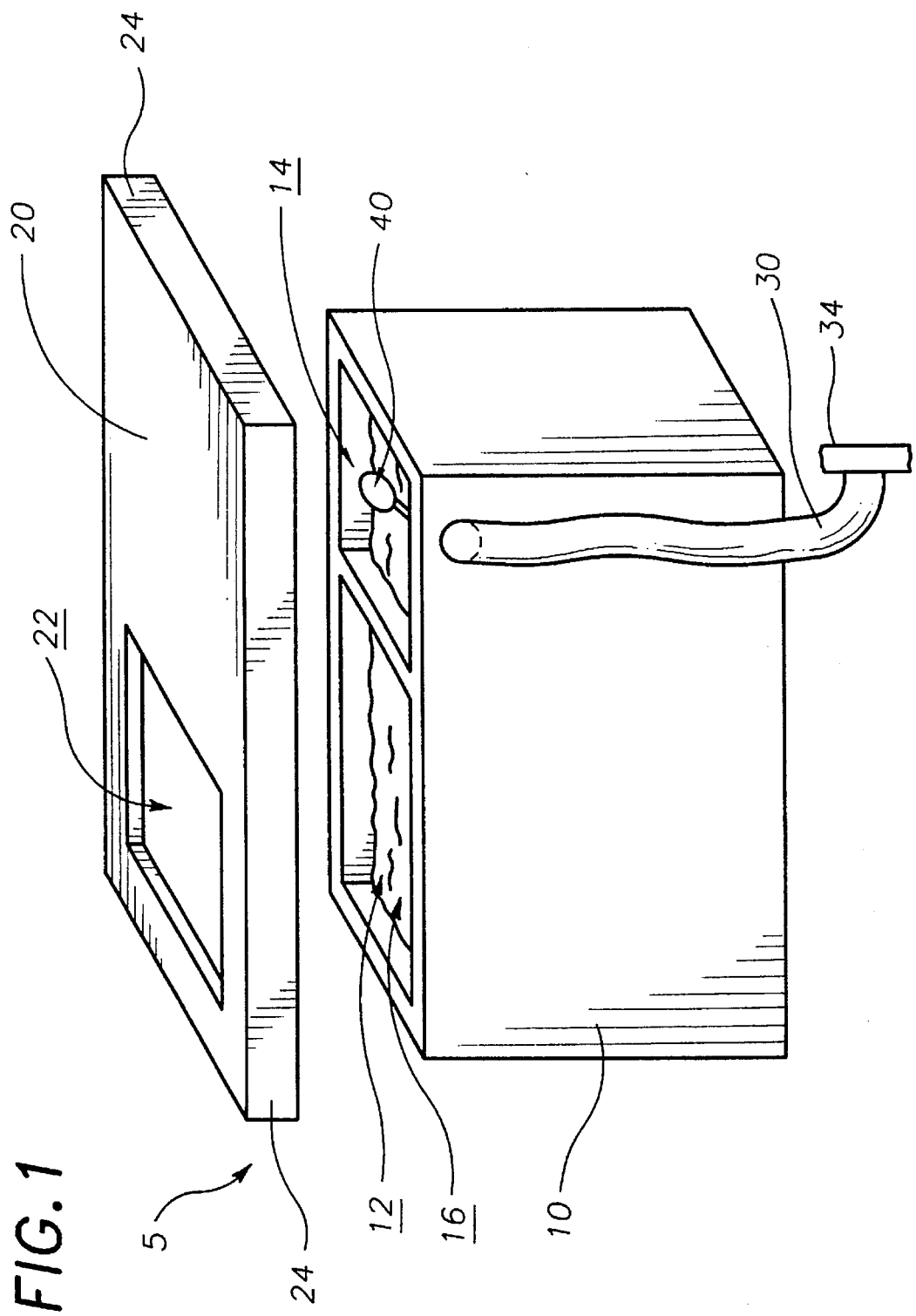
FIG. 1 is a perspective view of an exemplary embodiment of the automatic pet watering device.

FIG. 1 is a perspective view of one embodiment of the automatic pet watering device of the present invention generally designated by the numeral 5. In this embodiment the pet watering device 5 includes a watering container 10, a watering container lid 20, a water supply hose 30, and a valve mechanism 40. Water supply hose has a second end 34.

Watering container 10 has a reservoir cavity 12 therein. Watering container 10 is made of one-eights inch thick rigid plastic. In the exemplary embodiment reservoir cavity 12 has a first end area 14 and a second end area 16. Valve mechanism 40 is located within reservoir cavity 12 in second end area 14.

Lid 20 is constructed of one eights inch plastic and is functionally secured to container 10 by four one half inch perpendicular extending edges 24 (two not shown). Lid 20 has a lid opening 22 therethrough. In the exemplary embodiment lid opening 22 is located above second end 16 of reservoir cavity 12. Lid 20 rests on top of container 10.

Figure 2:
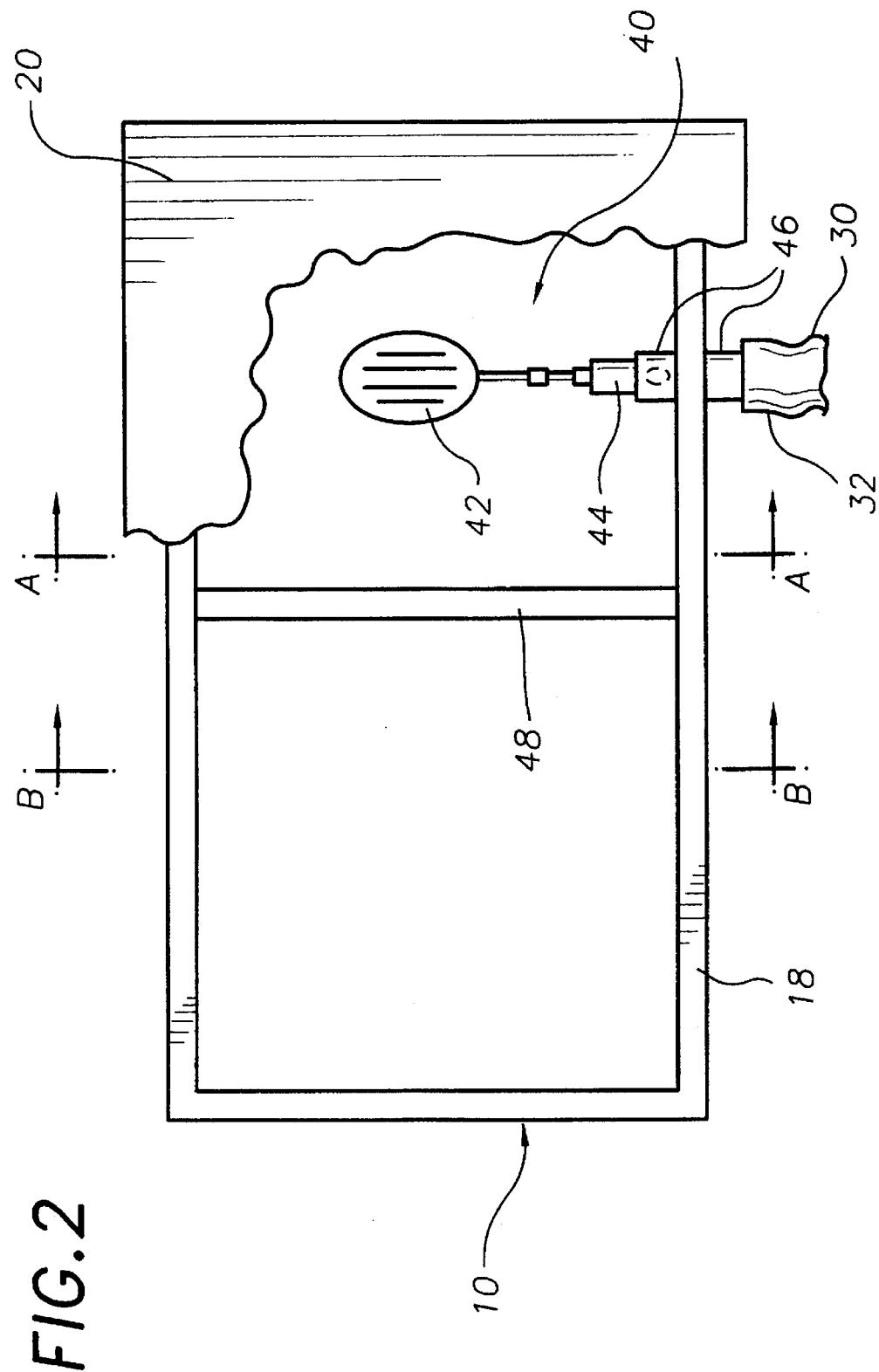
FIG. 2 is a top view of the embodiment of the pet watering device of FIG. 1.

FIG. 2 illustrates a top view of container 10, valve mechanism 40, and a partial section of lid 20. In the exemplary embodiment valve mechanism 40 is a ball cock mechanism as commonly known in the art having a float 42, and a plunger 44. In the exemplary embodiment container 10 includes a watering port 46 passing through a side wall 18 of container 10. A first end 32 of hose 30 is disposed about and in fluid communication with a first end 46a of a tubular watering port 46. Plunger 44 is insertable within a second end 46B of watering port 46 and seals same when the water level in reservoir 12 reaches a predetermined level. In the exemplary embodiment a valve shield 48 is attached to container 10. Valve shield 48 is a one eights inch thick, three inch high planer PVC member aligned vertically flush with the top of container 10.

Figure 3:
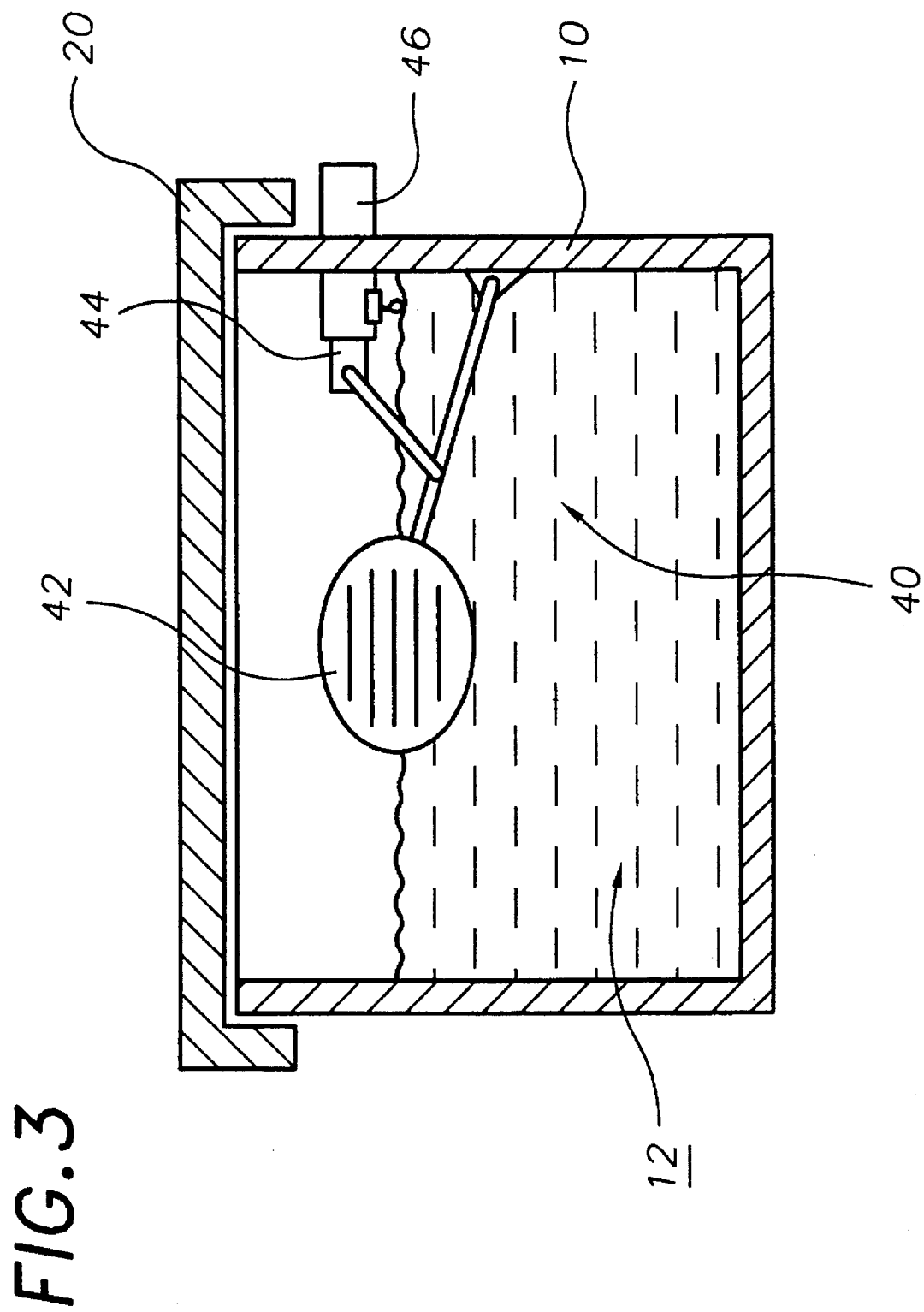
FIG. 3 is cross section 1—1 of the embodiment of the pet watering device of FIG. 2.

FIG. 3 is a cross section 1—1 of FIG. 2 showing container 10, lid 20, and valve mechanism 40. Float 42 rises and falls with the water level in reservoir 12. The rising and falling of float 42 causes plunger 44 to alternatively open and close the flow of water from watering port 46, thus maintaining the water level in reservoir 12 within predetermined limits.

Figure 4:
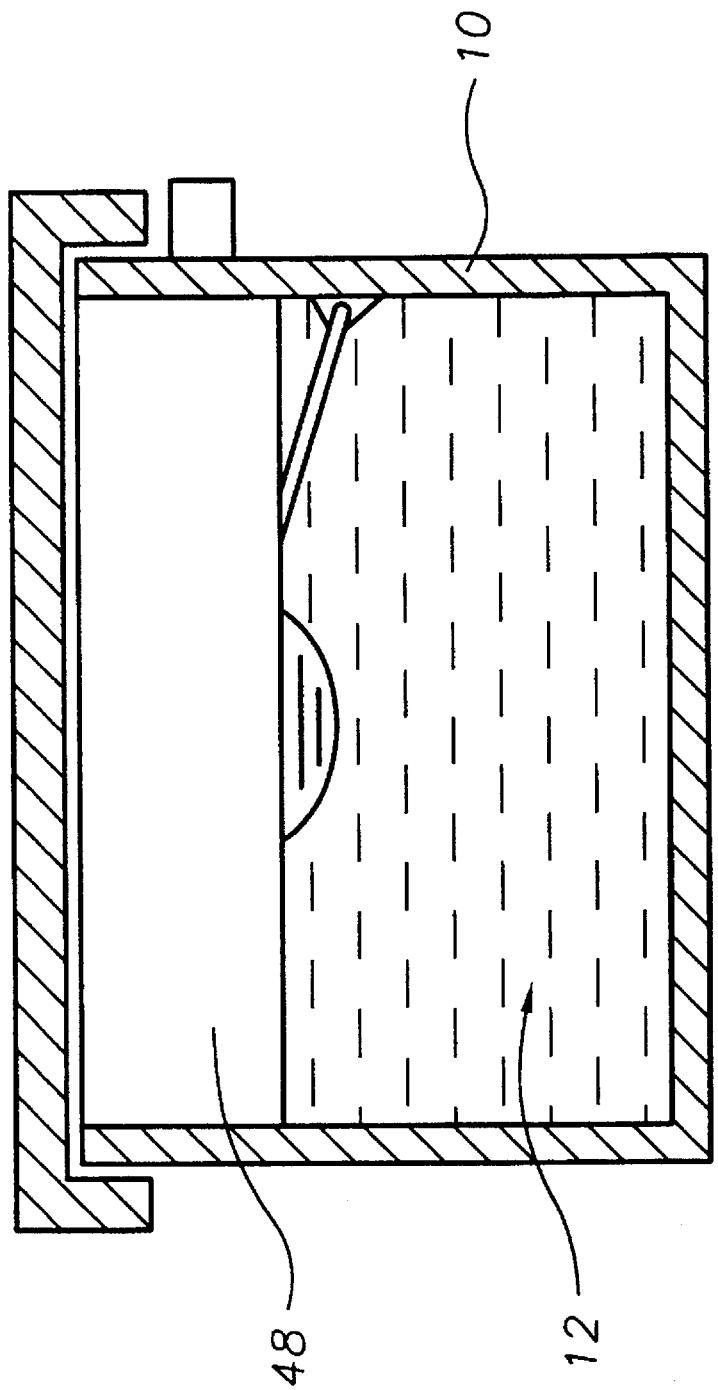
FIG. 4 is a cross section 2—2 of the embodiment of the pet watering device of FIG. 2.

FIG. 4 is a cross section 2—2 of FIG. 3. Container 10 includes valve shield member 48 within reservoir cavity 12.

Operation of the automatic pet watering device 5 is now described with reference to the aforementioned figures. Second end 34 of water supply hose 30 is in fluid communication with an external water supply source such as a garden hose or outdoor faucet. Water flows through supply hose 30 and exits from second end 32 into watering port 46 of container 10. Water enters reservoir 12 through watering port 46. As the water level in reservoir 12 rises float 42 rises. When float 42 reaches a predetermined position corresponding with the maximum water level height desired in reservoir 12 plunger 44 shuts off the inflowing water from watering port 46. Lid 20 is placed on top of container 10 such that opening 22 is disposed above second end area 16 of reservoir 12 opposite valve mechanism 40. A pet drinks water from reservoir 12 through opening 22. The water level in reservoir 12 lowers due to evaporation and the pet drinking same. Float 40 lowers with the water level. Plunger 44 is withdrawn from watering port 46 and water flows into reservoir 12. The process is repeated.

It can be seen from the preceding description that a device for providing a constant, uninterrupted water supply to pets to prevent dehydration, which is self regulating, maintenance free, low cost, and water conserving has been provided.

It is noted that the embodiment of the automatic pet watering device described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An automatic pet watering device comprising:

a watering container having a reservoir cavity formed therein, said reservoir cavity having a first and a second end area, a tubular watering port passing through a container sidewall and having a first end extending exteriorly of said container sidewall and a second end extending into said reservoir cavity, and a valve shield member located within said first end area of said reservoir cavity, said valve shield member being a substantially planar, three inch high, one eighth inch thick section of plastic attached to said watering container and aligned vertically flush with a top of said watering container;

a removable watering container lid having an opening therethrough and four one-half inch perimeter edges extending perpendicularly from said watering container lid in a manner to secure said watering container lid to said watering container when said watering container lid rests on top of said watering container, said lid opening being disposed above said second end area of said reservoir cavity when said container lid is positioned onto said watering container;

a water supply hose attached to said watering container having a first and second end, said first end in fluid communication with an external water source, said first end of said water supply hose including means for attaching a conventional garden hose thereto, said second end being disposed about said first end of said watering port; and a valve means attached to said watering container within said first end area of said reservoir cavity, said valve means being in fluid communication with said second end of said water supply hose such that in use a predetermined water level between one and three inches from said lid opening is maintained within said reservoir cavity, said valve means including a plunger insertable within said second end of said watering port in a manner to seal said watering port from the passage of water therethrough.

* * * * *